United States Patent Office 3,514,219
Patented May 26, 1970

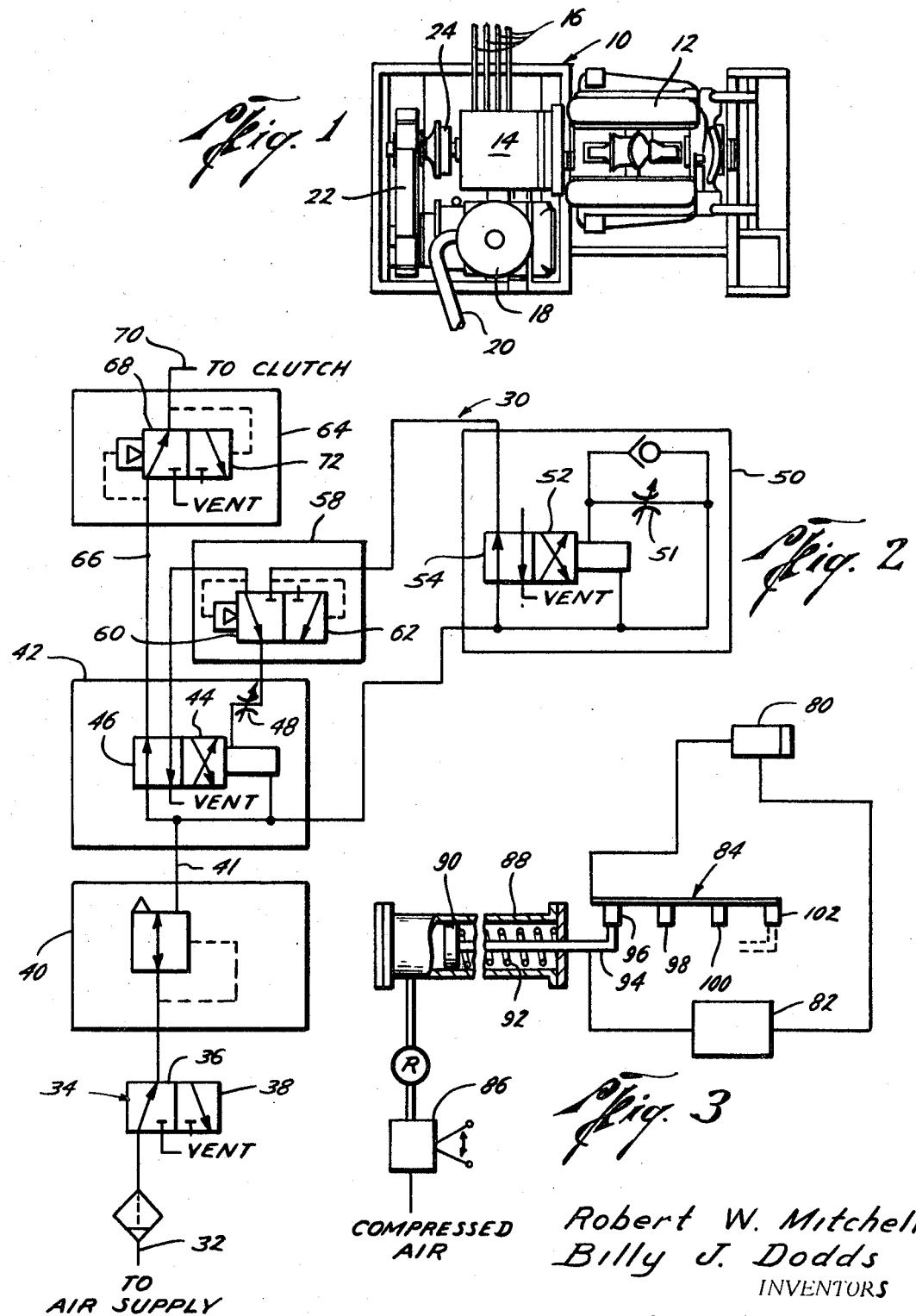

3,514,219
COMBINATION ELECTRICAL AND PNEUMATIC POWER SUPPLY AND METHOD
Robert W. Mitchell and Billy J. Dodds, Houston, Tex., assignors to Stewart & Stevenson Services, Inc., Houston, Tex., a corporation of Texas
Filed Aug. 28, 1968, Ser. No. 755,931
Int. Cl. F04b 49/02; H02p 9/04; F02c 7/26
U.S. Cl. 417—53                              8 Claims

ABSTRACT OF THE DISCLOSURE

A method and apparatus for simultaneously providing electrical and pneumatic power from a single minimum rated power source for utilizing the power source to power a generator for providing electrical power, and alternately engaging and disengaging a clutch connected to an air compressor at short intervals to start and gradually increase the speed and output of an air compressor without adversely decreasing the frequency output of the electrical generator until the air compressor is brought up to full speed and then fully engaging the clutch. A control system for controlling the actuation of the clutch including an air supply, a timing valve for alternately supplying exhausting air to and from the clutch for short intervals of time and valve means for connecting the air supply continuously to the clutch. A combination electrical ground power supply and air start unit for a jet aircraft engine having a diesel engine, an electrical generator connected to the diesel engine, an air actuated clutch connected between the diesel engine and the air compressor and a first time valve alternately supplying and disconnecting the air supply to the clutch at approximately one second intervals and a quick dump air valve connected to the clutch for exhausting air from the clutch when the air supply is disconnected, and a second timing valve supplying a constant air supply to the clutch and actuated only after the compressor is operating at substantially full speed.

BACKGROUND OF THE INVENTION

Auxiliary ground power equipment using a gasoline or diesel engine as a prime mover for actuating a generator or air compressor to supply electrical power and/or pneumatic power is old. However, in order to provide a combination electric and pneumatic power supply driven from a single prime mover, the prime mover in the past has been required to be greatly oversized for the running loads in order to satisfactorily carry the starting loads. By way of example only, a ground electrical power unit for an aircraft may require a power supply of 400 cycles per second in which the frequency limit is plus or minus 2%. Therefore, even though the air compressor may only be utilized for a short period of time in order to provide sufficient power to start up an air compressor to supply the pneumatic air power, the prime mover engine is required to be sized sufficiently great so that the starting load imposed by the air compressor as it is being brought up to speed does not slow the electrical generator down to cause a change in the electrical output frequency of more than 2%. Of course, the use of an oversized prime mover increases both the initial costs and the operation costs of the unit. The present invention is directed to providing a method and apparatus for simultaneously providing electrical and pneumatic power from a single minimal rated power source by allowing the prime mover to slowly pick up the air compressor load without adversely affecting the output of the electrical generator.

SUMMARY OF THE INVENTION

The present invention is directed to a method and apparatus for simultaneously providing electrical and pneumatic power from a single minimum rated power source by connecting the electrical generator to the power source for providing the electrical power supply, and providing a clutch between the prime mover and the air compressor, and means for alternately engaging and disengaging the clutch at short intervals of time for allowing the prime mover to gradually bring the compressor up to full speed before it is locked in without slowing down the prime mover and thus the generator more than a predetermined amount.

The present invention is further directed to providing a clutch and means for engaging and disengaging the clutch at short intervals of time such as one second until the air compressor is brought up to approximately full speed in the combination unit without reducing the frequency of the electrical generator to an objectionable level after which the clutch is fully engaged.

The present invention is further directed to providing a combination electrical power supply and pneumatic air supply unit operated from a single minimum rated power source by providing an air actuated clutch connected between the prime mover and the air compressor in which timing means are connected between an auxiliary air supply and the clutch for alternately supplying and exhausting air to and from the clutch for short intervals of time and thereafter connecting the air supply continuously to the clutch when the compressor is operating at substantially full speed.

It is a further object of the present invention to provide an apparatus and method for providing electrical power and simultaneously providing pneumatic power from a compressor from a single prime mover of a minimum rating by starting the prime mover and connecting the prime mover to the electrical generator for providing electrical power, alternately engaging and disengaging the clutch to start and gradually increase the speed of the compressor at short intervals without adversely affecting performance of the electrical generator, and fully engaging the clutch when the compressor is operating at near capacity.

Still a further object of the present invention is a method of providing electrical ground power to an airplane and simultaneously starting a jet engine of the plane with an air supply by utilizing a combination unit starter having a single prime mover operatively connected to an electrical generator and a clutch for connecting the prime mover to an air compressor by utilizing the prime mover to power the electrical generator at full load and at a substantially constant frequency while starting the compressor by alternately engaging and disengaging the clutch to bring the compressor slowly up to full speed and then securely engaging the clutch when the compressor is moving at substantially full speed.

BRIEF DESCRIPTION OF THE DRAWINGS

FIG. 1 is an elevational view of the apparatus of the present invention, and

FIG. 2 is a schematic control system for one type of control system for operation of the present invention, and FIG. 3 is an electrical schematic of an electrical control system for use in the present invention.

Referring now to the drawings, and particularly to FIG. 1, the reference numeral 10 generally indicates the combination electrical and pneumatic power supply of the present invention and generally includes a prime mover, for example a diesel engine 12 which is connected to an electrical generator 14, for example a three phase 140 kva., 400-cycle alternator which supplies electrical power leads 16 for an aircraft, and an air compressor 18 which supplies air through outlet 20 to an aircraft for, by the way of example only running pneumatic air conditioning or providing an air start for jet engines. The compressor 18 is suitably connected and driven by the prime mover 12 such as through a chain drive 22 and clutch 24 through the shaft of the generator 14.

Generally, the electrical generator 14 is connected to an aircraft to supply auxiliary electrical power while the aircraft is on the ground. However, the air compressor 18 in its use for starting jet engines is only used for a short period of time just prior to aircraft takeoff and thus just provides a load for a short period of time. While the prime mover 12 need only be sized at a certain rating to be adequate to carry the full load of both the generator 14 and the air compressor 18, the prime mover 12 would have to be greatly increased in size to pick up the starting lead of the compressor without slowing down of the prime mover 12 and thus the generator 14 an objectionable amount. For example, the electrical system of the aircraft requires that the steady state frequency of the electrical supply from the alternator 14 be held to plus or minus 2% of its rated frequency and in the event that the frequency does vary more than the allowed amount the switch will disconnect the alternator 14 from the aircraft's electrical system. While by way of example only, assuming that the diesel engine 12 need only be a 450-horsepower engine to adequately start and carry the full load of the generator 14 and the air compressor 18, it has been found that the engine would have to be sized approximately at 550 horsepower to carry the starting load of the air compressor 18 without slowing down the engine 12 and generator 14 and causing the frequency of the generator 14 to drop to an objectionable level.

The present invention is directed to a method and apparatus for simultaneously providing electrical and pneumatic power from a minimum rated power source by alternately engaging and disengaging the clutch 24 at short intervals of time to allow the air compressor 18 to be slowly brought up to full speed before being locked in without slowing down the prime mover 12 and thus the generator 14 below a predetermined amount.

In one embodiment, the clutch 24 may be an air actuated clutch and the control system, as best seen in FIG. 2, may be an air actuated control system for bringing the air compressor 18 up to full speed in four steps. Thus the air clutch control system 30 is connected to and receives air from line 32 which is connected to an auxiliary air supply and includes a manually operated off-on valve 34 which in position 36 transmits air to the remainder of the control circuit for actuation of the clutch and when in the off position 38 disconnects air from the control system and from the clutch for disengaging the clutch. An air pressure regulator 40 may be provided connected to the off-on valve 34 for regulating the input pressure to the control system and to the air clutch 24.

A first timing valve 42 is provided, which by way of example only, may be adjusted to approximately one second on intervals and one second off intervals having a first position 44 being the off position and a second position 46 being the on position with a needle valve 48 being adjusted to provide the desired timing cycle. A second timing valve 50 which is connected to receive pressure from the pressure regulator 40 through line 41 is provided having a timing cycle, for example, of off in position 52 for eight seconds and then permanently on in position 54 to deliver air through line 56 to a shuttle valve 58 shifting the shuttle valve from position 60 to a position 62 causing it to remain on and in turn holding timing valve 42 in the on position. A quick exhaust valve 64 is provided connected to line 66 and when air is supplied through line 66 from the first timing valve 42 the exhaust valve is placed in on position 68 to supply air to line 70 to actuate the air clutch 24 (FIG. 1). However, when the timing valve 42 is in the off position with position 44 in communication with the exhaust valve 64 the exhaust valve will move to position 72 to vent or dump air from line 70 and the clutch to the atmosphere thereby disengaging the clutch 14. Thus, with timing valve 42 timed off and on for intervals of one second and timing valve 50 having an off cycle for eight seconds and then fully on air will be supplied to the clutch off and on at one second intervals and on the fourth cycle the control circuit 30 will be automatically locked in to fully engage the clutch 14. However, as the clutch is alternately engaged and disengaged at one second intervals it will be connected to the diesel engine 12 through the shaft of the generator 14 and gradually brought up to full speed in load increments which are not sufficient to disrupt the operation of the generator 14.

Of course, the clutch 24 which may be actuated other than by air may, for example, be a magnetic clutch or a hydraulic clutch with a corresponding control circuit to suitably load the air compressor on the engine 12 at suitable intervals without disrupting the operation of the generator 14. Referring now to FIG. 3 a schematic diagram is shown in which a magnetic clutch 18 is shown which is connected to a suitable power source 82 and through a control switch generally indicated by the reference numeral 84. Thus an air off-on switch 86 may be provided to supply air to a cylinder 88 having a piston 90 which is normally yieldably urged in a first direction by a spring 92 and which carries an electrical movable contact 94. However, as air is applied to the first side of the piston and overcomes the spring 92, the contact 94 is longitudinally moved across a series of electrical contacts 96, 98, 100, and stops finally on contact 102. Thus as the moving contact 94 moves across the contacts electrical supply voltage is alternately connected and disconnected to the magnetic clutch 80 for suitably engaging and disengaging the clutch at the desired intervals. Of course, when the piston 90 reaches the end of its travel the moving contact 94 will rest against and remain in engagement with the contact 102 to hold the magnetic clutch 80 in the on position until the control switch 86 is moved to the off position.

In operation, the combination electrical and air supply unit 10 is placed adjacent a plane or other object to be serviced and the electrical conductors 16 are connected to the electrical system of the aircraft. Similarly, the hose 20 is connected to the aircraft to perform the function of operating aircraft air conditioning in those aircrafts having such pneumatically operated systems or is connected to jet engines for providing an air start when desired. The engine 12 is started turning the generator 14 and thus supplying electrical power through the conductors 16. When it is desired to use the air compressor 18 the control system is designed to engage the clutch 24 at suitable intervals for bringing the air compressor 18 up to speed in predetermined intervals of time before locking in in order to prevent slowing down of the engine 12 and thus the electrical generator 14. Thus referring to FIG. 2, the control circuit 30 may be used to operate an air actuated clutch 24 in which auxiliary air is supplied to line 32 and controlled by manually actuated on-off control lever 34 which when put in position 36 transmits air through pressure regulator 40 which regulates the air supply to line 41 to the desired pressure. Initially, the first timing valve 42 will be in position 44 whereby air is supplied from line 41 to shuttle valve 48 which is in position 60 to supply air through needle valve 48. Depending upon the timing adjustment of the shuttle valve 48, which as previously mentioned may be set for one second intervals, the air flowing through the needle valve 48 will build up sufficient differential pressure to shift the timing valve 42 to position 46 to direct air from line 41 through line 66 which in turn is moved into position 68 to transmit air through line 70 to the clutch 24 thereby actuating the clutch. But at the same time the differential pressure in the timing valve 42 is being vented through the needle valve 48 through position 60 of the shuttle valve 58 and position 46 of timing valve 42 to bleed down the pressure and after the set timing cycle, for example one second, timing valve 42 will again shift to position 44 thereby cutting off the supply of air to lines 66 and 70 and to the clutch at which time the quick dump valve 64 will shift to position 72 to vent line 70 and the clutch 24 of air thus disengaging the clutch 24. The timing cycle of valve 42 will continue at its set intervals by engaging and disengaging the clutch 24 slowly bringing the air compressor 18 up to full speed without undue effect upon the speed of the generator 14.

During the time the timing valve 42 is cycling, pressure is flowing through line 41 through needle valve 51 of the second timing valve 50. Normally, timing valve 50 is in position 52 but when the air passing through needle valve 51 increases sufficiently to build up sufficient differential pressure to shift valve 50 the valve will move into position 54 thereby transmitting air from line 41 to line 56 and causing shuttle valve 58 to move into position 62 thereby supplying a continuous supply of air to needle valve 48 on the first timing valve 42 which has the effect of keeping timing valve 42 in the on position and thus keeping the clutch 24 engaged. Valve 50 may be normally timed after a sufficient interval to allow timing valve 42 to bring the air compressor up to full speed, such as eight seconds, after which the timing valve 42 and clutch 24 are locked in for full operation.

Referring now to FIG. 3 a schematic diagram is shown of an electrical actuated circuit for sequencing and controlling the operation of a magnetic clutch 80. Thus, a control switch 86 admits air to cylinder 88 on one side of the piston 90 and acts against spring 92 to move contact 90 alternately into and out of engagement in sequence with contacts 96, 98, 100 and at the end of stroke into full engagement with contact 102 thereby alternately actuating and deactuating magnetic clutch 80 at timed intervals depending upon the speed of travel of the moving contact 94.

It is believed that the method of the invention is apparent from the foregoing description of apparatus of the invention. The method, however, comprises the method of providing electrical power and simultaneously providing pneumatic power from a compressor on a minimum of power operatively connected to an electrical generator, a compressor and a clutch by starting the prime mover, utilizing the prime mover to power the generator and provide electrical power, alternately engaging and disengaging the clutch to start and increase the output of the compressor without adversely decreasing the frequency output of the generator, and engaging the clutch when the compressor is operating at near capacity whereby the load on the prime mover is increased in a gradual manner so that the power supplied by the generator remains relatively constant. The method further comprehends providing electrical ground power to an airplane and simultaneously starting a jet engine using a starter having a single prime mover operatively connected to an electrical generator and compressor by utilizing the prime mover to power the generator to provide electrical ground power and maintaining the generator operating at substantially constant frequency while starting the compressor by alternately engaging and disengaging the clutch at frequent intervals to bring the compressor slowly up to full speed and securely engaging the clutch when the compressor is moving at substantially full speed.

The present invention, therefore, is well suited and adapted to obtain the objects and attain the ends and has the advantages mentioned as well as others inherent therein. While presently preferred examples of the invention have been given for the purpose of disclosure, many changes in the detail of construction, arrangement of parts and steps of the process may be made which are within the scope of the invention and the scope of the appended claims.

What is claimed is:

1. A combination electrical power supply and air power supply for an aircraft comprising,
    a single prime mover,
    an electrical generator connected to the prime mover for providing an electrical power supply,
    an air compressor for supplying air to start the jet engine,
    a clutch connected between the prime mover and the air compressor,
    means for alternately engaging and disengaging the clutch for allowing the prime mover to gradually bring the compressor up to full speed without slowing down the prime mover and thus the generator below a predetermined amount, and
    means for fully engaging the clutch when the compressor is brought up to substantially full speed.

2. The apparatus of claim 1 wherein the prime mover is a diesel engine.

3. The apparatus of claim 1 wherein the means for engaging and disengaging said clutch includes timing means engaging and disengaging said clutch at approximately one second intervals.

4. The apparatus of claim 1 wherein the clutch is an air actuated clutch and the means for engaging and disengaging and fully engaging the clutch includes,
    an air supply,
    timing valve means connected between the air supply and the clutch for alternately supplying and exhausting air to and from the clutch for short intervals of time, and valve means for connecting the air supply continuously to said clutch.

5. The apparatus of claim 4 wherein the timing valve includes
    valve means alternately supplying air and exhausting air from the clutch at approximately one second intervals.

6. A combination electrical ground power supply and air start unit for a jet engine aircraft comprising,
    a single prime mover,
    an electrical generator connected to the prime mover for providing an electrical ground power supply,
    an air compressor for supplying air to start a jet engine,
    an air actuated clutch connected between the prime mover and the air compressor,
    an auxiliary air supply,
    a first time valve for alternately supplying and disconnecting said air supply to said clutch at short intervals of time,
    a quick dump air valve connected to the clutch for exhausting air from the clutch when air is disconnected from the clutch, and
    second timing valve for supplying a constant supply of air to the clutch when actuated, said second time valve being actuated only after the compressor is operating at substantially full speed.

7. A method of providing electrical power and simultaneously providing pneumatic power from a compressor on a minimum of power utilizing a single prime mover operatively connected to an electrical generator, a compressor, and a clutch for operatively connecting the prime mover to the compressor when the clutch is engaged, comprising the steps of
    starting the prime mover,
    utilizing the prime mover to power the generator and provide electrical power,
    alternately engaging and disengaging the clutch to start and gradually increase the output of the compressor without adversely decreasing the frequency output of the generator, and
    engaging the clutch when the compressor is operating at near capacity whereby the load on the prime mover is increased in a gradual manner so that the power supplied by the generator remains sufficiently constant for operative purposes.

8. A method of providing electrical ground power to an airplane and simultaneously starting a jet engine of the plane utilizing a starter which is comprised of a single prime mover operatively connected to an electrical generator, a compressor, and a clutch for connecting the prime mover to the compressor when the clutch is engaged, comprising the steps, starting the prime mover, utilizing the prime mover to power the generator to provide electrical ground power, maintaining the generator operating at a substantially constant frequency while starting the compressor by alternately engaging and disengaging the clutch at frequent intervals to bring the compressor slowly up to full speed, and securely engaging the clutch when the compressor is moving at substantially full speed whereby the additional load placed on the prime mover by starting and operating of the compressor is increased gradually to prevent a decrease in power supplied by the prime mover to the generator to such an extent that the generator operates off of frequency.

References Cited

UNITED STATES PATENTS

| | | | |
|---|---|---|---|
| 887,252 | 5/1908 | Jackson | 230—15 |
| 2,009,001 | 7/1935 | Peterson. | |
| 2,130,957 | 9/1938 | Ringsley | 230—15 |
| 2,733,661 | 2/1956 | Surgi | 103—23 |
| 3,196,341 | 7/1965 | Gieb | 290—4 |
| 3,345,517 | 10/1967 | Smith | 290—30 |
| 3,465,162 | 9/1969 | Oprecht | 60—39.14 |

WILLIAM L. FREEH, Primary Examiner

U.S. Cl. X.R.

60—39.14; 290—1; 417—313, 319, 364